United States Patent [19]

Jacobson

[11] Patent Number: 4,785,896

[45] Date of Patent: Nov. 22, 1988

[54] LOAD SENSING STRUCTURE FOR WEIGHING APPARATUS

[75] Inventor: Walter E. Jacobson, Meriden, Conn.

[73] Assignee: Revere Corporation of America, Wallingford, Conn.

[21] Appl. No.: 107,972

[22] Filed: Oct. 13, 1987

[51] Int. Cl.$^4$ .......................... G01G 3/14; G01G 3/08; G01L 1/22

[52] U.S. Cl. .................................. 177/211; 177/229; 73/862.65

[58] Field of Search .............................. 177/211, 229; 73/862.65

[56] References Cited

U.S. PATENT DOCUMENTS

| | | | |
|---|---|---|---|
| 4,411,327 | 10/1983 | Lockery et al. | 177/211 |
| 4,506,746 | 3/1985 | Lockery | 177/211 |
| 4,526,246 | 7/1985 | Patoray | 177/211 X |
| 4,574,899 | 3/1986 | Griffin | 177/211 |
| 4,598,781 | 7/1986 | Tramposch | 177/211 |

Primary Examiner—George H. Miller, Jr.
Attorney, Agent, or Firm—McCormick, Paulding & Huber

[57] ABSTRACT

A load sensing structure for weighing has a rectangular deck with four flexure members supporting the deck. Each flexure member has attachment portions secured to the deck and oppositely facing attachment portions secured to a fixed platform. U-shaped flexure intermediate portions have parallel legs or beams that are connected to one another by a rigid base of the U, and these legs are also cantilever connected to the attachment portions. Two strain gages on one such leg are so located that these gages must sense tension and compression to indicate weight in the bridge circuit. If both detect tension or both compression no weight indication will occur.

18 Claims, 3 Drawing Sheets

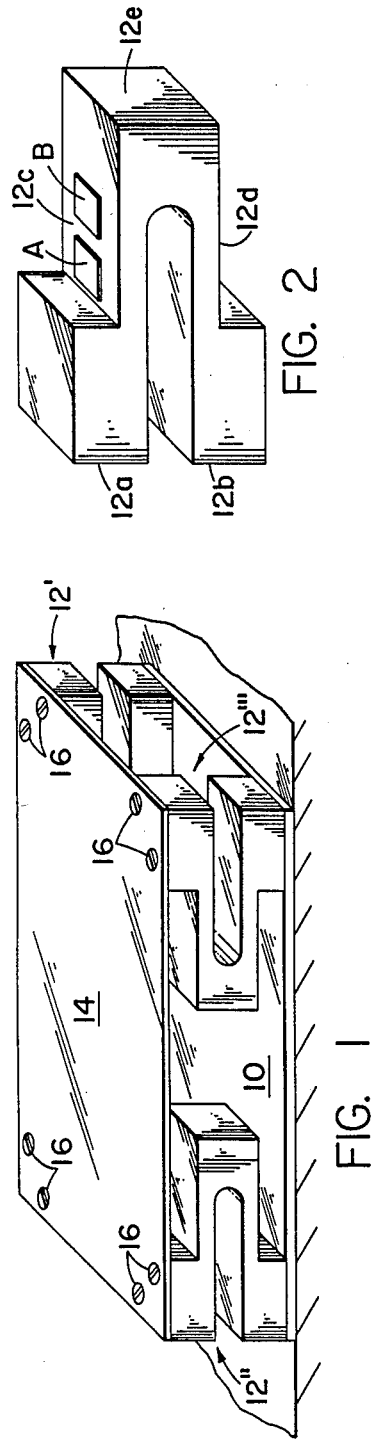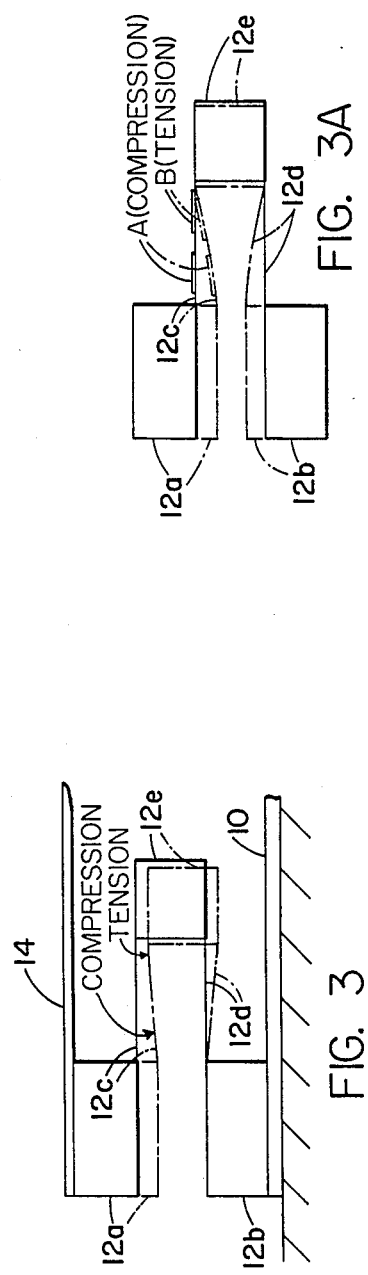

LOAD SENSING STRUCTURE FOR WEIGHING APPARATUS

The present invention relates generally to weighing apparatus of the type utilizing load sensing structures for generating electrical signals proportional to a load provided on a deck supported by at least two flexure members having strategically placed strain gages that generate electrical signals in a bridge circuit. The bridge circuit provides an output proportional to the load placed on the deck.

The general purpose of the present invention is to provide such a load sensing structure wherein the configuration and orientation of the flexure members and the location for the strain gages are so selected that side loads exerted on the deck and on the load sensing structure will not contribute significant errors to the signals produced in the bridge circuit by the strain gages as a result of forces applied perpendicularly to the deck.

In a preferred embodiment of the invention the deck is generally rectangular and the load sensing structure includes four flexure members adjacent the corners of the rectangle to support the deck in spaced parallel relationship to an underlying platform or fixed structure. Each flexure member is strain sensitive in the vertical direction having oppositely facing attachment portions secured to the deck and to the platform respectively. An intermediate portion of the flexure member is provided between these attachment portions and has a generally U-shape with generally parallel flexure legs or beams connected in cantilever fashion to the attachment portions respectively. These legs extend away from the attachment portions in generally parallel relationship to one another and to the plane of the rectangular deck. The intermediate portion of each flexure member further includes a rigid base of the U-shape intermediate portion, which base serves to connect the free ends of the cantilevered flexure legs to one another. The flexure legs are cantilever mounted to one another and to their respective attachment portions.

As so constructed and arranged a deck is supported by at least two such strain sensitive flexure members. The flexure members are fitted with two strain gages on at least one of the legs of the U. A first one of the two strain gages is provided closer to an associated attachment portion of the flexure member and the other strain gage is provided closer to the base than the first.

As a result of this geometry for the flexure member, and as a result of these locations for the two strain gage elements associated with each flexure member, both strain gages can be provided in a conventional bridge circuit so as to complement one another in response to loads imposed perpendicular the deck. These strain gages will tend to cancel the signals generated by one another as a result of side loads imposed on the deck structure that is in the plane of the deck structure itself. For example, side loads imposed on the deck structure and/or loads imposed on the deck structure by expansion and contraction of the deck itself will not result in extraneous or erroneous signals when the weighing apparatus is used for its primary purpose of detecting downward forces perpendicular to the deck structure.

BRIEF DESCRIPTION OF THE DRAWINGS

FIG. 1 shows in a perspective view the overall configuration for a weighing apparatus incorporating a load sensing structure in accordance with the present invention.

FIG. 2 is a detailed view of one flexure member and associated strain gages apart from the deck and platform structure in the weighing apparatus of FIG. 1.

FIG. 3 illustrates schematically the physical deformation of the flexure member as a result of a downward force exerted on the deck structure perpendicular to the surface of the deck.

FIG. 3A illustrates schematically the deflection or deformation of the flexure member of FIG. 3 but with movement depicted relative to the base of the U-shaped intermediate portion rather than relative to the platform as a result of a downward force exerted perpendicularly to the plane of the deck.

DETAILED DESCRIPTION

Figure 5:
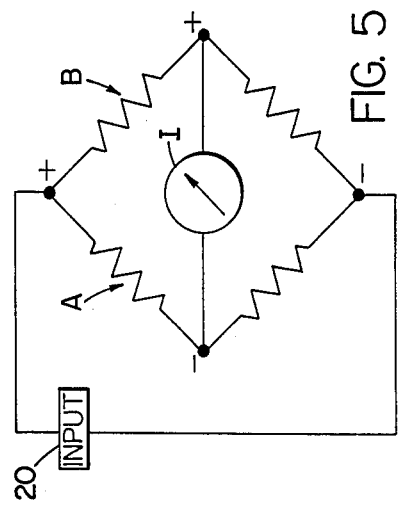
FIG. 5 illustrates a typical Wheatstone bridge circuit of the type utilized to indicate changes in the electrical signals produced in the paired strain gages provided on a flexure member in accordance with the present invention.

Turning now to the drawings in greater detail, FIG. 1 shows a weighing apparatus in the form of a load sensing structure including a fixed frame or platform 10 together with four identical strain sensitive flexure members 12, 12', 12" and 12"' provided at opposite corners of a generally rectangular deck 14. Placement of an object to be weighed on the deck 14 will deform the four flexure members and permit appropriately placed strain gages to detect deformation of these flexure members through electrical signals generated by a bridge circuit of the type illustrated in FIG. 5.

In accordance with the present invention and as illustrated in FIG. 2, each flexure member 12 has opposed oppositely facing attachment portions 12a, 12b one of which is secured to the platform 10 and the opposite attachment portion 12a is secured to the underside of the deck 14 preferably by two or more screws or bolts as suggested in FIG. 1.

With reference to FIG. 3 it will be apparent that a downward load L exerted on the deck 14 tends to deform the generally parallel legs 12c and 12d of the flexure member 12 from the solid to the broken line positions shown.

While the provision of a flexure member between a deck and frame or platform in a weighing apparatus is old in the art, the present configuration for the flexure member fixedly connected between the platform and the deck together with the specific locations for the strain gage means leads to improved results with the use of two or more such flexure members in a load sensing structure. As shown in FIG. 2 the upper leg or beam 12c of the flexure member 12 is provided with strain gage means in the form of two individual strain gages A, B that are provided in spaced relationship to one another on the flexure leg 12c and more particularly so that one of said two gages A is provided closer to the attachment portion 12a associated with the underside of the deck 14. Furthermore, the other of said two strain gages B is provided close to the relatively rigid base portion 12e of the flexure member 12 than is the said one strain gage A.

FIG. 5 shows how the two strain gages A and B might be provided in a Wheatstone bridge circuit so that the bridge circuit can be energized by electrical input power means 20 in order to provide an indication on a suitable indicator I related to the strain sensed by the gages A and B collectively. Where a typical Wheatstone bridge might provide for only one of the four resistors in the bridge circuit as a strain measuring gage the present invention contemplates the use of two resistances A and B in the form of strain gage sensing elements in order that the electrical resistance variation caused by the strain sensed in these gages A and B will have a accumulative or complementary effect on the resulting bridge circuit leading to an increased amplitude signal for the indicator I as a result of a given load on the deck 14 tending to compress the flexure member attachment portions 12a and 12b toward one another.

Referring now more particularly to FIG. 3a the attachment portions 12a and 12b are shown in full lines in an unstressed configuration and in broken lines in exaggerated form to illustrate the deflected or stress configuration as a result of a downward load L on the deck or upper attachment portion 12a. As illustrated in FIG. 3a the leg or beam 12c of the flexure member 12 will assume a shape approximating that shown in FIG. 3a so as to generate in strain gage A a flexural compressive strain and so as to generate in strain gage B a flexural tensile strain. When the resistance changes resulting from these oppositely directed strains of strain gages A and B is provided in the bridge circuit of FIG. 5, the resulting effect on indicator I will be accumulative or complementary and increase the displacement or amplitude of the indicator I.

Figure 4:
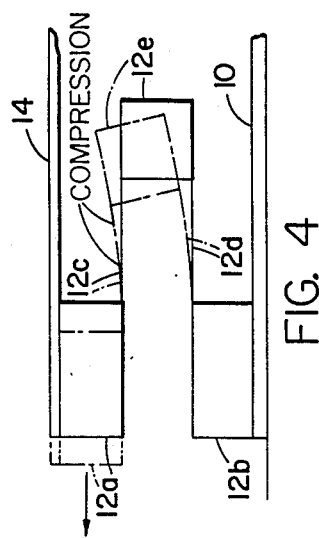
FIG. 4 illustrates schematically the deformation of the flexure member of FIG. 3 when side load are imposed on the deck structure relative to the fixed underlying platform.
Figure 4A:
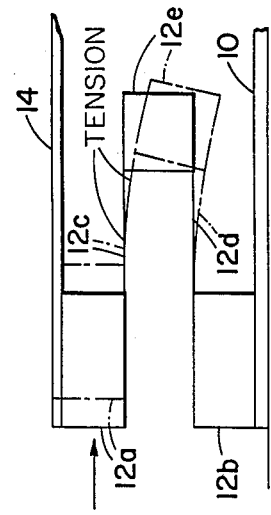
FIG. 4A illustrates schematically the flexure member of FIG. 4 but with both attachment portions of the flexure member shifted laterally relative one another in order to illustrate the deflection for the legs of the U-shaped intermediate portion.

Turning next to a more detailed description of FIGS. 4 and 4A the reader will recall the initial purpose for the unique geometry for the flexure member 12 and placement of the strain gages A and B set out hereinabove. More particularly, the purpose of the present invention is to provide not only a load sensing structure for presenting a visual indication of strain, by a flexure member provided between a deck and a platform, but to also obviate or eliminate as nearly as possible the extraneous signals imposed on these gages when a force other than the downward force L is provided on the deck or by the deck 14. As illustrated in FIG. 4, the deck 14 may experience a side load of the type illustrated as S in FIG. 4 with the result that flexure member 12 can be deformed from the solid line position of FIG. 4 to a deformed condition as suggested generally by the broken lines of FIG. 4. As a result of the geometry for the flexure member 12 the legs or beams 12c and 12d will be bent upwardly as suggested in this view with the top or upper leg 12c being placed in tension plus bending throughout its length and with the lower leg 12d being placed in compression plus bending at least along its upper surface. As shown in FIG. 4 and as indicated generally by the two T's indicated at the upper surface of the upper leg 12c, strain gages A and B will both tend to provide an indication in bridge circuit of FIG. 5 of a tension force and an associated resistance change at the locations located generally at A and B in this view. As a result, the bridge circuit will still be balanced and the indicator I will not indicate displacement such as would be the case from imposition of the downward load L. It will be apparent that should the side force S illustrated in FIG. 4 be reversed in direction, the two strain gages A and B will then be placed in compression, but in equal amounts, the result being that strain gages A and B in the bridge circuit of FIG. 5 will tend not to unbalance the bridge in much the same manner as described above with reference to the actual side force S of FIG. 4.

The geometry for the flexure member 12 together with the placement of the strain gages A and B on the leg or beam of the flexure member 12 provides a unique result when these strain gages are wired into the Wheatstone bridge circuit as suggested in FIG. 5. More particularly, the result will be that indicator I provides an accurate indication of the magnitude in the direction of the force L but will not experience any unwanted changes plus or minus due to the imposition of the side forces such as indicated at S in FIG. 4 on the deck 14 of the type that might for example be caused by changes in temperature of the deck 14 relative to the platform 12 and/or by side forces however imposed.

Figure 6:
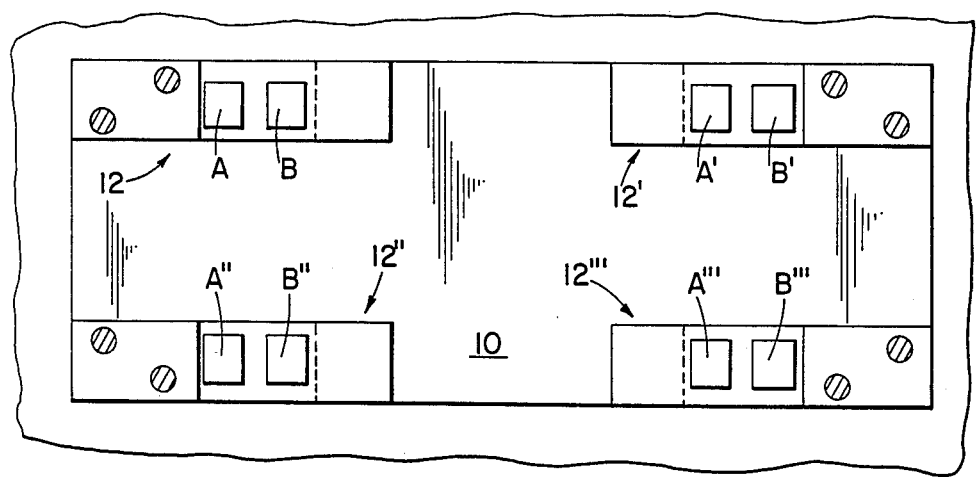
FIG. 6 is a plan view of the flexure members with the deck omitted to identify the various strain gages provided on these members.
Figure 7:
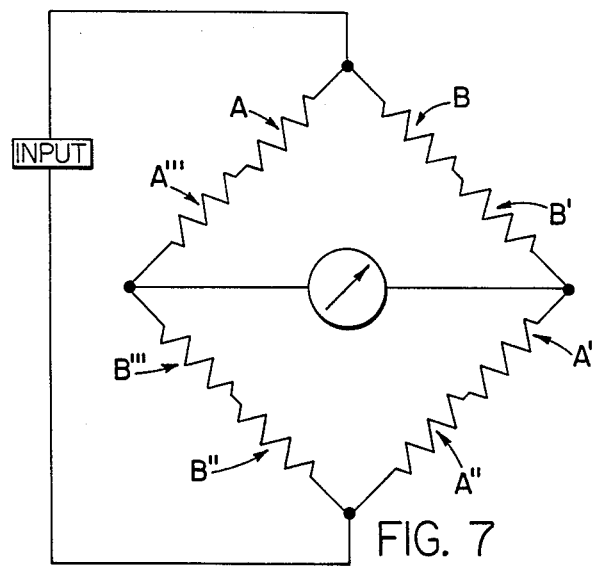
FIG. 7 is a Wheatstone bridge circuit with all eight strain gages of FIG. 6 in a single bridge circuit.

Referring now to FIG. 6 the total strain gage patterns for the four flexure members 12, 12', 12" and 12'" as shown in FIG. 1. These eight gages are preferably all placed in a common bridge circuit as suggested in FIG. 7. Note that each pair A and B, A' and B', A" and B", A'" and B'" is provided so that the gages are adjacent one another.

Finally, it should be noted that the flexure members 12, 12', 12" and 12'" are oppositely oriented so that their opposed attachment portions are located adjacent the four corners of the rectangular deck 14. Furthermore, each flexure member has its attachment portions located one above the other, an orientation that is maintained even as the deck 14 moves down in response to a vertical load or weight imposed on it. As suggested in FIG. 3, for example, the rigid base 12 is supported solely by the legs or beams of the flexure member and therefor is moved with these legs (in addition to causing these legs to be deformed to create compression in gage A and tension in leg B for example). This geometry assures that deck itself does not create any bending stresses on the flexures during such weight induced deformations. Thus, the loading sensing structure described and claimed herein has a degree of lateral compliance not achievable in prior art weighing apparatus generally.

I claim:

1. A load sensing structure including a platform and a planar deck provided in spaced parallel relationship to the platform, at least one strain sensitive flexure member having oppositely facing attachment portions and an intermediate portion therebetween, one said attachment portion fixedly connected to said platform and capable of absorbing forces having components parallel said platform, an oppositely facing attachment portion fixedly connected to said deck and capable of absorbing forces having components parallel said deck, said intermediate portion having a generally U-shape with generally parallel flexure legs connected in cantilever fashion to said attachment portions respectively, said legs extending away from said attachment portions in generally parallel relationship to one another, said intermediate portion having a generally rigid base, said base connecting the ends of said cantilevered flexure legs to one another so that said legs are also cantilever mounted to one another by said base.

2. The load sensing structure of claim 1 wherein said flexure member has an axis of symmetry oriented parallel said flexure legs, said flexure legs being of equal length.

3. The load sensing structure of claim 1 wherein at least two flexure members support said deck in spaced relationship to said platform, said one attachment portion of each flexure member being located above said oppositely facing attachment portion thereof.

4. The load sensing structure of claim 1 further including strain gage means provided on at least one flexure leg and electric circuit means for sensing changes in resistivity of said strain gage means in response to strains causes by forces exerted on said deck and reacted by said platform.

5. The load sensing structure of claim 4 wherein aid strain gage means comprises at least two individual strain gages provided in spaced relationship to one another on said flexure leg, one of said two gages provided closer to one of said attachment portions than the other of said two gages.

6. The load sensing structure of claim 5 wherein the other of said two strain gages is provided closer to said rigid base than said one stain gage.

7. The load sensing structure of claim 5 wherein said electric circuit means comprises a Wheatstone bridge circuit with at least four resistive elements so connected to one another as to provide an indication of changes in the resistivity of any of said four elements, said at least two individual strain gages comprising two of said four bridge circuit elements.

8. The load sensing structure of claim 7 wherein the other of said two strain gages is provided closer to said rigid base than said one stain gage.

9. The load sensing structure of claim 7 wherein said flexure member has an axis of symmetry oriented parallel said flexure legs, said flexure legs being of equal length.

10. The load sensing structure of claim 7 wherein at least two flexure members support said deck in spaced relationship to said platform, said one attachment portion of each flexure member being located above said oppositely facing attachment portion thereof.

11. The load sensing structure of claim 1 wherein said deck is of rectangular configuration and wherein at least four flexure members support said deck in spaced generally parallel relationship to said platform, each of said flexure members having an axis of symmetry oriented in a plane parallel the plane of said deck and generally intermediate said deck and said platform, said flexure legs being of equal length.

12. The load sensing structure of claim 11 further including strain gage means provided in each flexure member, and electric circuit means for sensing changes in resistivity of said strain gage means in response to strains caused by forces exerted on said deck.

13. The load sensing structure of claim 12 wherein each of said four strain gage means comprises at least two individual strain gages provided in spaced relationship to one another on one flexure leg of each of said four flexure members, one of said two gages provided closer to one of said member's attachment portions than the other of said two gages.

14. The load sensing structure of claim 13 wherein the other of said two strain gages provided on said one flexure leg is closer to said rigid base than is said one stain gage, each of said four strain gage means having said spacing for individual strain gages.

15. A weighing apparatus comprising a fixed platform and a planar deck provided in spaced relationship to said platform
at least four flexure members provided in a rectangular pattern and each flexure member having one attachment portion rigidly connected to said platform, each flexure member having an oppositely facing attachment portion rigidly connected to said deck, and an intermediate portion of U-shape with generally parallel flexure legs, each of said legs extending cantilever fashion from an associated attachment portion, and said U-shaped intermediate portion having a rigid base connecting said legs to one another in cantilever fashion,
two strain gages on at least one leg of each flexure member, one gage provided adjacent one said attachment portions, and a second gage adjacent said rigid base, and
electric bridge circuit means including said strain gages for indicating changes in the resistivity thereof.

16. The weighing apparatus of claim 15 wherein each of said two strain gages on a leg of said flexure member comprises one of two adjacent resistive elements in said bridge circuit means and produce opposite resistive changes in response to a weight force imposed on said deck.

17. The weighing apparatus of claim 15 wherein said flexure member attachment portions are arranged in spaced relationship one above another and wherein they remain substantially so oriented during the weighing operation.

18. A weighing apparatus including a platform and a deck spaced above the platform, at last two strain sensitive flexure members supporting the deck, each member having attachment portions, one attachment portion being rigidly connected to said platform and a second attachment portion rigidly connected to said deck, each said flexure member having legs oriented parallel said deck, each flexure member including a lower leg having one end supported cantilever fashion at said one attachment portion so that the neutral axis of said lower leg one end remains parallel to said platform under load imposed on said deck, each flexure member including an upper leg having one end supported cantilever fashion at said second attachment portion so that the neutral axis of said upper leg one end remains parallel to said deck under loads imposed on said deck, said flexure member legs having ends opposite to said one ends, and means rigidly connecting said opposite ends of said upper and lower flexure legs to one another so that the neutral axes of said flexure legs remain parallel to one another under loads imposed on said deck.

* * * * *